United States Patent
Wang et al.

(10) Patent No.: US 9,729,428 B2
(45) Date of Patent: Aug. 8, 2017

(54) PEER-TO-PEER CONNECTION SYSTEM WITH CAPABILITY OF PEER-TO-PEER CONNECTION PATH ROUTING, PATH ROUTING METHOD OF PEER-TO-PEER CONNECTION AND COMPUTER APPLICATION PROGRAM THEREOF

(71) Applicant: JSW Pacific Corporation, New Taipei (TW)

(72) Inventors: Hsien-Hsiu Wang, New Taipei (TW); Yin-Chung Chen, New Taipei (TW)

(73) Assignee: JSW PACIFIC CORPORATION, New Taipei (TW)

( * ) Notice: Subject to any disclaimer, the term of this patent is extended or adjusted under 35 U.S.C. 154(b) by 386 days.

(21) Appl. No.: 14/557,669

(22) Filed: Dec. 2, 2014

(65) Prior Publication Data

US 2015/0237122 A1     Aug. 20, 2015

(30) Foreign Application Priority Data

Feb. 18, 2014   (TW) .............................. 103105370 A (51) Int. Cl.
*G06F 15/16*     (2006.01)
*H04L 12/721*    (2013.01)
*H04L 29/08*     (2006.01)

(52) U.S. Cl.
CPC .............. *H04L 45/14* (2013.01); *H04L 45/70* (2013.01); *H04L 67/025* (2013.01); *H04L 45/124* (2013.01)

(58) Field of Classification Search
CPC ........ H04L 45/14; H04L 45/70; H04L 67/025

USPC .......................................... 709/227, 242, 219
See application file for complete search history.

(56) References Cited

U.S. PATENT DOCUMENTS

| 2005/0169313 | A1* | 8/2005 | Okamura | H04J 3/1694 370/477 |
| 2009/0144441 | A1* | 6/2009 | LoGalbo | H04L 65/4046 709/235 |
| 2014/0208404 | A1* | 7/2014 | Brouwer | G06F 21/62 726/6 |
| 2015/0055566 | A1* | 2/2015 | Lin | H04W 48/20 370/329 |

\* cited by examiner

*Primary Examiner* — Bryan Lee
*Assistant Examiner* — Oluwatosin Gidadao
(74) *Attorney, Agent, or Firm* — Chun-Ming Shih; HDLS IPR Services (57) ABSTRACT

A peer-to-peer connection system for peer-to-peer connection path routing provides an optimal connection path between a client electronic device and a target subsystem. The peer-to-peer connection system comprises a target subsystem, at least one relay subsystem and the client electronic device. The target subsystem and the relay subsystem connect to internet via different routers respectively. The target subsystem comprises a target device; the relay subsystem comprises a relay device. The target device and the relay device transmit a connection quality table to the client electronic device respectively. The client electronic device determines the optimal connection path according to the connection quality tables. This application program can provide the optimal peer-to-peer connection path via making the relay device be a relay node of peer-to-peer connection according to the connection quality tables.

17 Claims, 6 Drawing Sheets

PEER-TO-PEER CONNECTION SYSTEM WITH CAPABILITY OF PEER-TO-PEER CONNECTION PATH ROUTING, PATH ROUTING METHOD OF PEER-TO-PEER CONNECTION AND COMPUTER APPLICATION PROGRAM THEREOF

FIELD OF INVENTION

The present invention relates to a peer-to-peer connection system, path routing method of peer-to-peer connection and computer application program thereof, especially to a peer-to-peer connection system with capability of peer-to-peer connection path routing, path routing method of peer-to-peer connection and computer application program thereof.

BACKGROUND OF THE INVENTION

Remote operation of network device and remote surveillance through network device become popular as the progress of computer hardware and omnipresence of internet. User can operate a local electronic device to operatively connect to a remote network device through peer-to-peer connection once the user knows the IP address of the remote network device. Therefore, user can operate the remote network device or perform remote surveillance (or monitoring) through the remote network device.

However, in the conventional peer-to-peer network connection system, the local electronic device is operatively connected to the remote network device through a single peer-to-peer connection path. The connection path between the local electronic device and the remote network device may be broken or have poor quality once a network wire in connection path is broken or excessive users use the network path simultaneously. The conventional peer-to-peer network connection system may not provide satisfactory quality for user.

It is desirable to provide a more effective peer-to-peer connection system to address above problems.

SUMMARY OF INVENTION

It is an object of the present invention to provide a peer-to-peer connection system with capability of peer-to-peer connection path routing, path routing method of peer-to-peer connection and computer application program thereof, thus providing an optimal connection path between a client electronic device and a target subsystem.

Accordingly, the present invention provides a peer-to-peer connection system, comprising a target subsystem, at least one relay subsystem and a client electronic device. The target subsystem is operatively connected to internet through a first router and comprising a target device, the target device comprises: a storage module for storing a connection-quality table; a processor module operatively connected to the storage module and configured to send the connection-quality table after receiving a request for inquiring connection quality; the at least one relay subsystem operatively connected to internet through a second router and comprising a relay device. The relay device comprises a storage module for storing a connection-quality table; a processor module operatively connected to the storage module and configured to send the connection-quality table after receiving a request for inquiring connection quality; and a relay module operatively connected to the storage module and providing peer-to-peer connection relay service. The client electronic device is operatively connected to internet and configured to receive a connection request and send the connection request to the target device and the relay device, the client electronic device configured to determine an optimal connection path after receiving the connection-quality table. The optimal connection path starts from the client electronic device and ends at the target subsystem.

Accordingly, the present invention provides a path routing method of peer-to-peer connection applied to a peer-to-peer connection system, the peer-to-peer connection system comprising a target subsystem, at least one relay subsystem and a client electronic device, the target subsystem operatively connected to internet through a first router and comprising at least one target device, the relay subsystem operatively connected to internet through a second router and comprising at least one relay device. The method comprises following steps: a) the client electronic device receiving a request for connection; b) the client electronic device sending request for inquiring connection quality to the target device and the relay device; c) the client electronic device receiving a connection quality table from the target device or the relay device; and d) the client electronic device determining an optimal connection path starting from the client electronic device and ending at the target subsystem.

Accordingly, the present invention provides a computer application program comprising a computer executable source code, the steps according to above method being executed when a computer executed the computer application program.

In comparison with related art, the present invention uses relay device as relay node for peer-to-peer connection and determines an optimal connection path according to connection quality table, this providing an optimal peer-to-peer connection path.

DETAILED DESCRIPTION

In the present invention, the target subsystem and the relay subsystem have the same or similar hardware. The target device and the relay device have the same or similar function. However, in the following description, different names are used to refer to those subsystems and devices. It should be noted that the target subsystem and the relay subsystem are not limited to have different hardware, while the target device and the relay device are not limited to have different functions.

In the following description, operative connection means wired connection or wireless connection. For brevity, a device A operatively connects to a device B means that the device A is connected to the device B either through wired or wireless connection.

In the following description, the subsystem may not be a single hardware device and can be a system constituted by one or more devices arranged in specific network range (such as the same LAN) or in specific geometric range (such as the same building).

In following description, the registration information is referred to as the necessary information (such as network address) required for connecting to specific device. The external device can operatively connect to the specific device through internet according to the registration information of the specific device. Beside the necessary information, the registration information can further include device information for identifying the specific device such as device ID or device type information. The device ID is used to identify the currently-used device and the device type information is used to identify the device type of the currently-used device such as peer-to-peer device, gateway device, relay device for peer-to-peer connection or network camera.

In the following description, the connection quality table of a specific device is used to indicate the connection quality value of the specific device as the specific device is operatively connected to an external device. Preferably, the connection quality table includes the connection quality value of the specific device as the specific device is operatively connected to all identifiable subsystems. It should be noted that the connection quality table of a specific device is used to indicate the connection quality value of the specific device as the specific device is operatively connected to an external device.

Figure 1A:
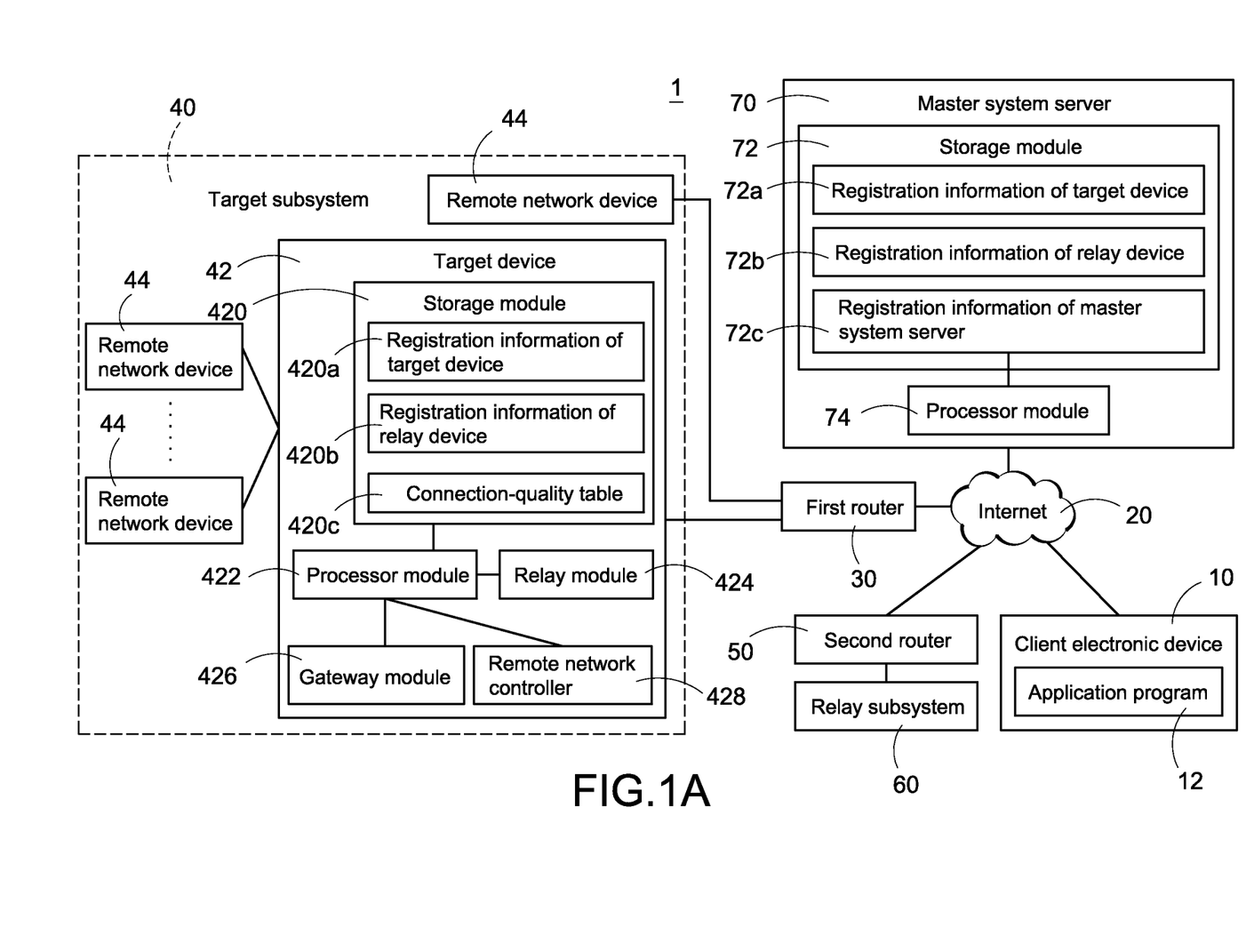
FIGS. 1A and 1B show the system diagram of the peer-to-peer connection system 1 according to the first embodiment of the present invention.
Figure 1B:
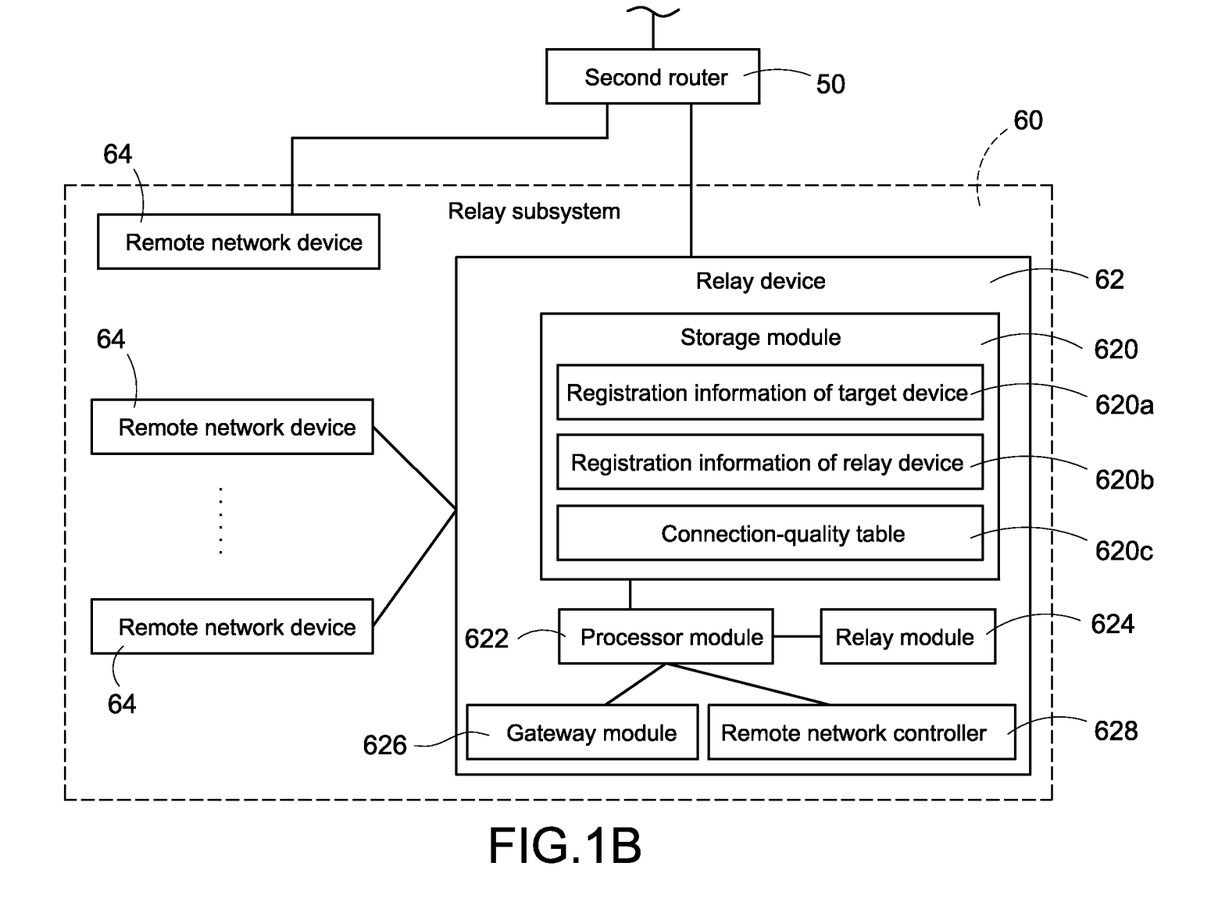

FIGS. 1A and 1B show the system diagram of the peer-to-peer connection system 1 according to the first embodiment of the present invention, and those drawings are used to illustrate the peer-to-peer connection path routing strategy between the client electronic device and a target subsystem. The peer-to-peer connection system 1 according to the present invention mainly comprises a target subsystem 40, at least one relay subsystem 60 and a client electronic device 10. The target subsystem 40 operatively connects to internet 20 through a first router 30, and comprises a target device 42. The relay subsystem 60 operatively connects to internet 20 through a second router 50, and comprises a relay device 62. The application program 12 is installed in the client electronic device 10 and the client electronic device 10 also operatively connects to internet 20.

The target subsystem 40 comprises the target device 42 and preferably all devices in target subsystem 40 can be arranged in the same network domain by connecting to the first router 30. Moreover, those devices in the target subsystem 40 can be assigned with dynamic/static IP address by the first router 30.

The target device 42 comprises a storage module 420 and a processor module 422 and external devices can operatively connect to the target device 42 through internet by registration information 420a in the target device 42.

The storage module 420 also stores a connection-quality table 420c, and the connection-quality table 420c records the connection quality between the target device 42 and all identifiable relay subsystem. The connection-quality table 420c may contain value to indicate connection quality between the target device 42 and the relay subsystem 60. The connection quality value can be, but not limited to response time, and can also be transmission speed and connection establishing time.

The processor module 422 operatively connects to the storage module 420 and sends the connection-quality table 420c to the client electronic device 10 upon receiving request from the client electronic device 10.

According to another embodiment of the present invention, the storage module 420 further comprises registration information of the relay device. The processor module 422 periodically sends a first detection request to the relay device 62 in the relay subsystem 60. The processor module 422 updates the connection-quality table 420c after receiving the first detection reply sent from the relay device 62. More particularly, the processor module 422 calculates the connection quality value ark and stores the newly calculated connection quality bench value mark to the connection-quality table 420c. The connection quality value can be, but not limited to, response time between the time of issuing the first detection request and the time of receiving the first detection reply, or the transmission speed between the target device 42 and the relay device 62.

The relay subsystem 60 comprises the relay device 62 and preferably all devices in relay subsystem 60 can be arranged in the same network domain by connecting to the second router 50. Moreover, those devices in the relay subsystem 60 can be assigned with dynamic/static IP address by the second router 50.

The relay device 62 comprises registration information 620b and external devices can operatively connect to the relay device 62 through internet 22 by registration information 620a in the relay device 62. The relay device 62 comprises a storage module 620 and a processor module 622.

The storage module 620 also stores a connection-quality table 620c, and the connection-quality table 620c records the connection quality value between the target device 42 and the relay subsystem 62. The connection-quality table 620c may contain value to indicate connection quality between the target device 42 and the relay subsystem 60. The connection quality value can be, but not limited to response time, and can also be transmission speed and connection establishing time.

The processor module 622 operatively connects to the storage module 620 and sends the connection-quality table 620c to the client electronic device 10 upon receiving request from the client electronic device 10.

According to another embodiment of the present invention, the storage module 620 further comprises registration information 620b of the relay device. The processor module 622 periodically sends a second detection request to the target device 42 in the target subsystem 40. The processor module 622 updates the connection-quality table 620c after receiving the second detection reply sent from the target device 42. More particularly, the processor module 622 calculates the connection quality value and stores the newly calculated connection quality value to the connection-quality table 620c. The connection quality value can be, but not limited to, response time between the time of issuing the first detection request and the time of receiving the first detection reply, or the transmission speed between the target device 42 and the relay device 62.

The relay device 62 further comprises a relay module 624 connecting to the processor module 622 and adapted to provide peer-to-peer relay service. The relay device 62 functions as relay node for peer-to-peer relay service by the provision of the relay module 624. In other word, the client electronic device 10 first establishes peer-to-peer connection with the relay device 62 and then the relay module 624 of the relay device 62 establishes peer-to-peer connection with the target device 42, whereby the client electronic device 10 can establish peer-to-peer connection with the target device 42 through different connection path.

The application program 12 is installed in the client electronic device 10 and the client electronic device 10 can receive a request for connecting to the target subsystem 40. The client electronic device 10 preferably executes the application program 12 to provide a graphic user interface (not shown). Therefore, user can operate the graphic user interface to input connection request. The client electronic device 10 sends request for inquiring connection quality to the target device 40 and the relay device 62 upon receiving the connection request. The client electronic device 10 can determine an optimal connection path after receiving the connection-quality table 420c or the connection-quality table 620c. The optimal connection path starts from the client electronic device 10 and ends at the target subsystem 40.

According to another embodiment of the present invention, the client electronic device 10 determines at least one candidate connection path after receiving the connection-quality table 420c or the connection-quality table 620c. The candidate connection path starts from the client electronic device 10 and ends at the target subsystem 40. Afterward, the client electronic device 10 calculates estimated connection quality for each candidate connection path and then determines an optimal connection path according to the estimated connection quality. In this embodiment, the estimated connection quality is an estimated response time. More particularly, the estimated response time is an estimated response time for peer-to-peer connection through the candidate connection path. The client electronic device 10 sets the candidate connection path with the shortest response time as the optimal connection path.

Taking following scenario as an example, after the client electronic device 10 sends request for inquiring connection quality to the target device 40 and the relay device 62, the client electronic device 10 gets the connection-quality table 420c from the target device 40 and the connection-quality table 620c from the relay device 62 within a predetermined time (for example, 10 seconds). The response time of the target device 42 is 8 seconds and the response time of the relay device 62 is 3 seconds. Moreover, the response time from the relay device 62 to target device 42 is 2 seconds according to the record in the connection-quality table 620c. Therefore, the client electronic device 10 selects the relay device 62 as relay node for the connection between the client electronic device 10 and the target device 42. Afterward, the client electronic device 10 determines two candidate connection paths, where the candidate connection path A is peer-to-peer connection between client electronic device 10 and the target device 42, and the candidate connection path B is peer-to-peer connection between client electronic device 10 and the target device 42 through the relay of the relay device 62. The client electronic device 10 then calculates the connection quality values for these two candidate connection paths. The connection quality value for candidate connection path A is the response time of the target device 42, namely, 8 seconds. The connection quality value for candidate connection path B is the sum of the response time of the relay device 62 and the response time of the target device 42 to the relay device 62, namely, 5 seconds. Therefore, the client electronic device 10 selects the candidate connection path B as the optimal connection path.

In this embodiment, the connection quality value is the estimated response time and the client electronic device 10 selects the candidate connection path with the shortest response time as the optimal connection path. However different criterions may be applied in selecting the optimal connection path. For example, the connection quality value may be the connection speed, and the client electronic device 10 selects the candidate connection path with the fastest connection speed as the optimal connection path.

In another embodiment of the present invention, the peer-to-peer connection system 1 further comprises a master system server 70. The master system server 70 operatively connects to internet 22 and has registration information 72c therein. The master system server 70 is preferably assigned with static IP address. The master system server 70 comprises a storage module 72 and a processor module 74. The storage module 72 stores registration information 72a of the target device and registration information 72b of at least one relay device. The processor module 74 operatively connects to the storage module 72 and further operatively connects with the client electronic device 10. The processor module 74 further sends the registration information 72a of the target device and the registration information 72b of the relay device to the client electronic device 10.

The client electronic device 10 operatively connects with the master system server 70 according to the registration information 72c in the master system server 70 and fetches the s the registration information 72a of the target device and the registration information 72b of the relay device. The registration information 72c of the master system server 70 is preferably stored in the client electronic device 10. The client electronic device 10 sends request for inquiring connection quality to the target device 42 according to the registration information 72a of the target device, and sends request for inquiring connection quality to the relay device 62 according to the registration information 72b of the relay device. The client electronic device 10 preferably establishes peer-to-peer connection with the target device 42 and the relay device 62.

According to another embodiment of the present invention, the processor module 422 of the target device 42 periodically sends the current registration information 420a of the target device to the master system server 70. The processor module 622 of the relay device 62 periodically sends the current registration information 620b of the relay device to the master system server 70. The processor module 74 of the master system server 70 updates the registration information 72a of the target device and the registration information 72b of the relay device in the storage module 72 according to the received registration information 420a of the target device and the received registration information 620b of the relay device. Therefore, the storage module 72 of the main system server 70 can be updated with the newest registration information 72a of the target device and the newest registration information 72b of the relay device.

According to another embodiment of the present invention, the target subsystem 40 further comprises a remote network device 44 operatively connects to the target device 42 or the first router 30. The target device 42 further comprises a gateway module 426 and a remote network controller 428. The gateway module 426 operatively connects to the processor module 422 and operatively connects the remote network device 44 to the first router 30. The remote network controller 428 operatively connects to the processor module 422 and monitors the remote network device 44. The client electronic device 10 can monitor the remote network device 44 through the remote network controller 428 after the client electronic device 10 operatively connects to the target device 42. The remote network device 44 is preferably network camera, digital video recorder (DVR), camera with object-sensing function or sensor.

The relay subsystem 60 further comprises at least one remote network device 64 operatively connecting to the relay device 62 or the second router 50. The relay device 62 further comprises a gateway module 626 and a remote network controller 628.

The gateway module 626 operatively connects to the processor module 622 and operatively connects the remote network device 64 to the second router 50. The remote network controller 628 operatively connects to the processor module 622 and monitors the remote network device 64. The client electronic device 10 can monitor the remote network device 64 through the remote network controller 628 after the client electronic device 10 operatively connects to the relay device 62. The remote network device 64 is preferably network camera, digital video recorder (DVR), camera with object-sensing function or sensor.

According to another embodiment of the present invention, the target device 42 further comprises a relay module 424 operatively connecting to the processor module 422 and providing peer-to-peer relay connection service. By employing the relay module 424, the target device 42 can function as the relay device to provide peer-to-peer relay connection service. In other word, the client electronic device 10 can first establishes peer-to-peer connection with the target device 42 and then the relay module 424 of the target device 42 establishes peer-to-peer connection with the relay device 62 when the client electronic device 10 intends to connect to the relay device 62. Therefore, the client electronic device 10 can establish peer-to-peer connection to the relay device 62 through different connection path.

Figure 2:
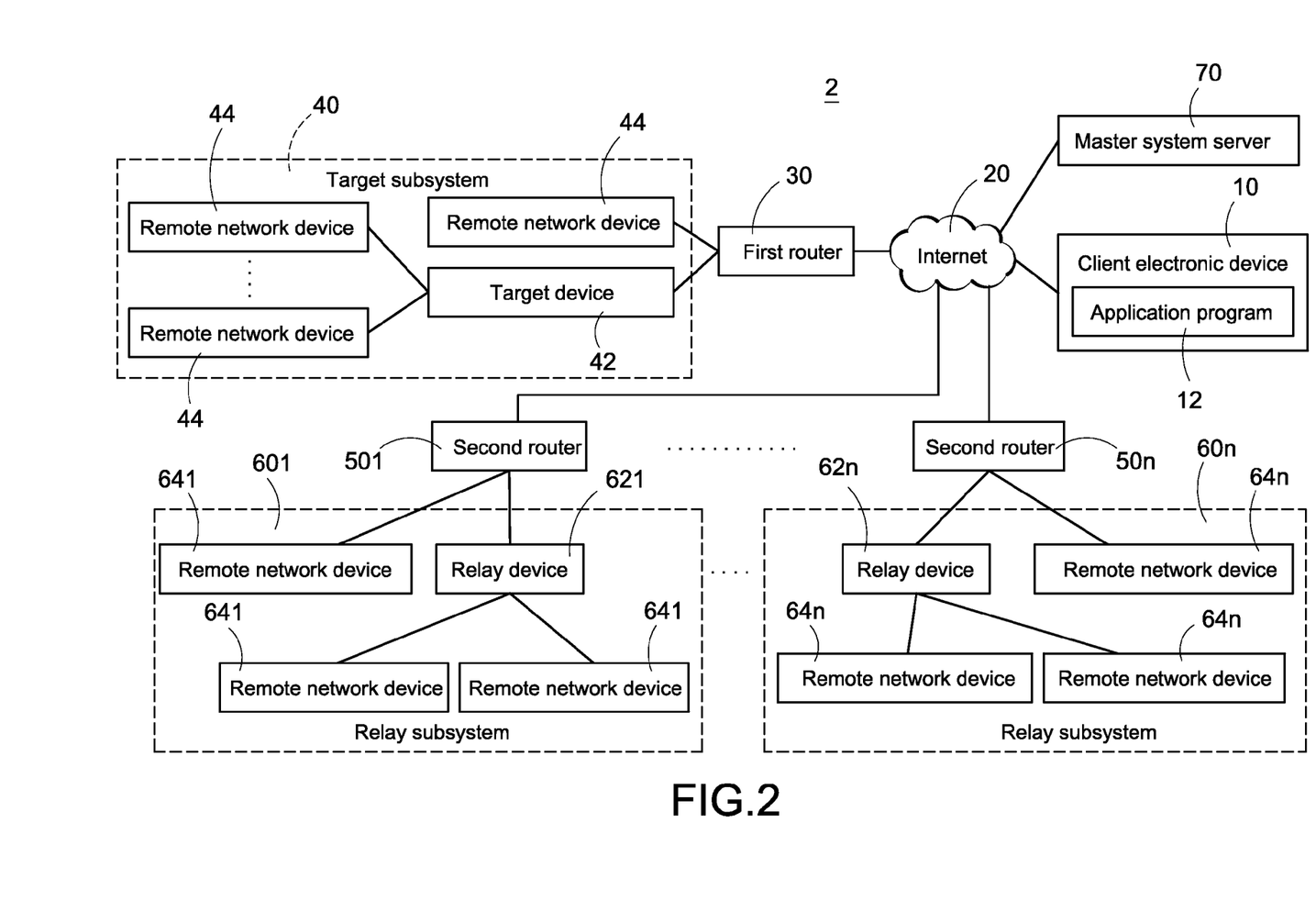
FIG. 2 shows the system diagram of the peer-to-peer connection system 2 according to the second embodiment of the present invention.

FIG. 2 shows the system diagram of the peer-to-peer connection system 2 according to the second embodiment of the present invention. The embodiment shown in FIG. 2 is different from the embodiment shown in FIGS. 1A and 1B in that the peer-to-peer connection system 2 according to the second embodiment comprises a plurality of second routers 501-50n and a plurality of target subsystems 601-60n. Therefore, the description for the embodiment in FIG. 2 will be made for the difference with the embodiment in FIGS. 1A and 1B for brevity.

In this embodiment, the storage modules in the relay devices 621-62n further store the registration information of all relay devices 621-62n. The relay device 621 sends the second detection request to the other relay devices 622-62n according to the registration information of the relay devices 622-62n. The relay device 621 updates the connection-quality table therein according to the second replies sent from the relay devices 622-62n. The connection-quality table further contains the connection quality value between the relay device 621 and the relay subsystems 602-60n. The processor module of the relay device 621 calculates the connection quality value between the relay device 621 and the relay subsystems 602-60n according to the second replies from the relay devices 622-62n.

The client electronic device 10 further sends a request for inquiring the connection quality to the relay devices 621-62n and receives the connection-quality tables within a predetermined duration. The client electronic device 10 then determines at least one candidate connection path according to the received connection-quality table, where the candidate connection path starts from the client electronic device 10 and ends at the target subsystem 40. The candidate connection path preferably includes at least one of the relay devices 621-62n as its relay node. More candidate connection paths can be generated and better optimal connection path can be provided by increasing the number of relay nodes. The client electronic device 10 has more satisfactory connection path with the target subsystem 40.

Figure 3:
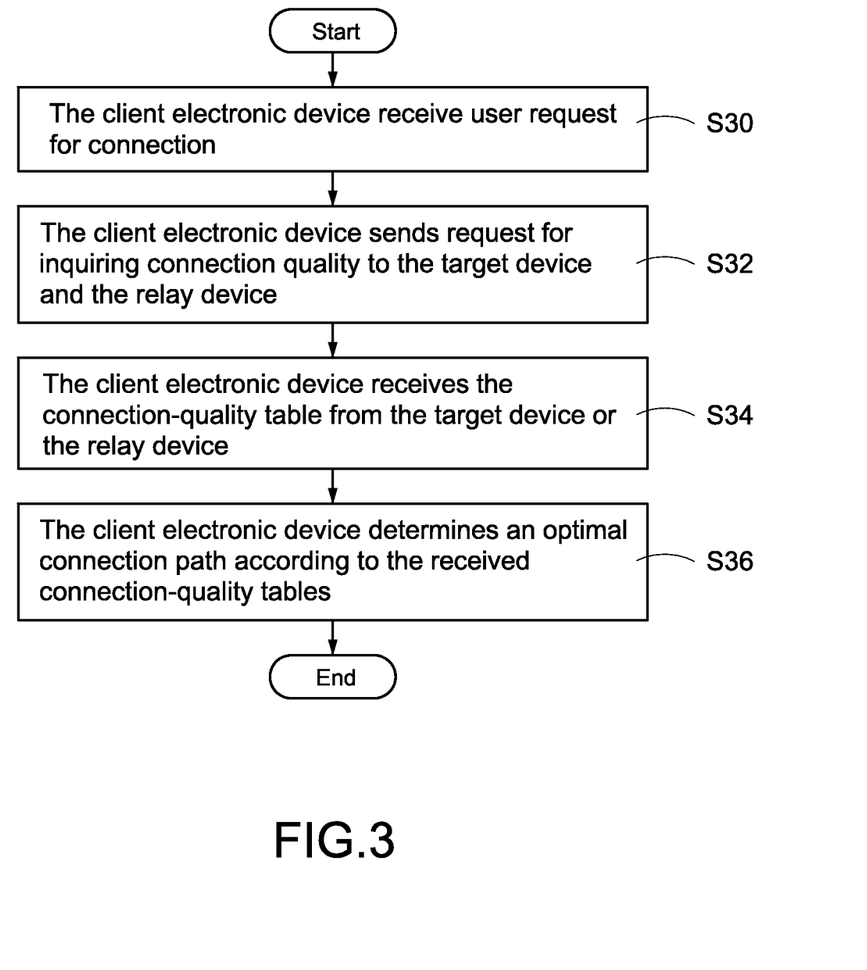
FIG. 3 shows the flowchart for the path routing method of peer-to-peer connection according to the third embodiment of the present invention.

FIG. 3 shows the flowchart for the path routing method of peer-to-peer connection according to the third embodiment of the present invention. The method can be implemented with the system 1 shown in FIGS. 1A and 1B; alternatively, the method can also be implemented with the system 2 shown in FIG. 2, where the application program 12 in the client electronic device 10 performs following steps.

As shown in FIG. 3, in step S30, the client electronic device 10 first executes the application program 12 to receive user request for connecting to the target subsystem 40. The client electronic device 10 preferably receives user request through a graphic user interface (GUI).

In step S32, the client electronic device 10 sends request for inquiring connection quality to the target device 42 and the relay device 62. The client electronic device 10 preferably sends request for inquiring connection quality to the target device 42 according to the registration information 420a of the target device 42, and to the relay device 62 according to the registration information 620b of the target device In step 34, the client electronic device 10 receives the connection-quality table from the target device 42 or the relay device 62. The client electronic device 10 preferably admits to receive the connection-quality table from the target device 42 or the connection-quality table from the relay device 62 within a predetermined duration after the client electronic device 10 sends request for inquiring connection quality to the target device 42 and the relay device 62. The connection-quality table 420c or 620c contains connection-quality value indicating the connection quality between two devices to be operatively connected.

In step S36, the client electronic device 10 determines an optimal connection path according to the received connection-quality tables. More particularly, the client electronic device 10 determines a plurality of candidate connection paths according to the received connection-quality tables, and selects an optimal connection path among the candidate connection paths.

Figure 4A:
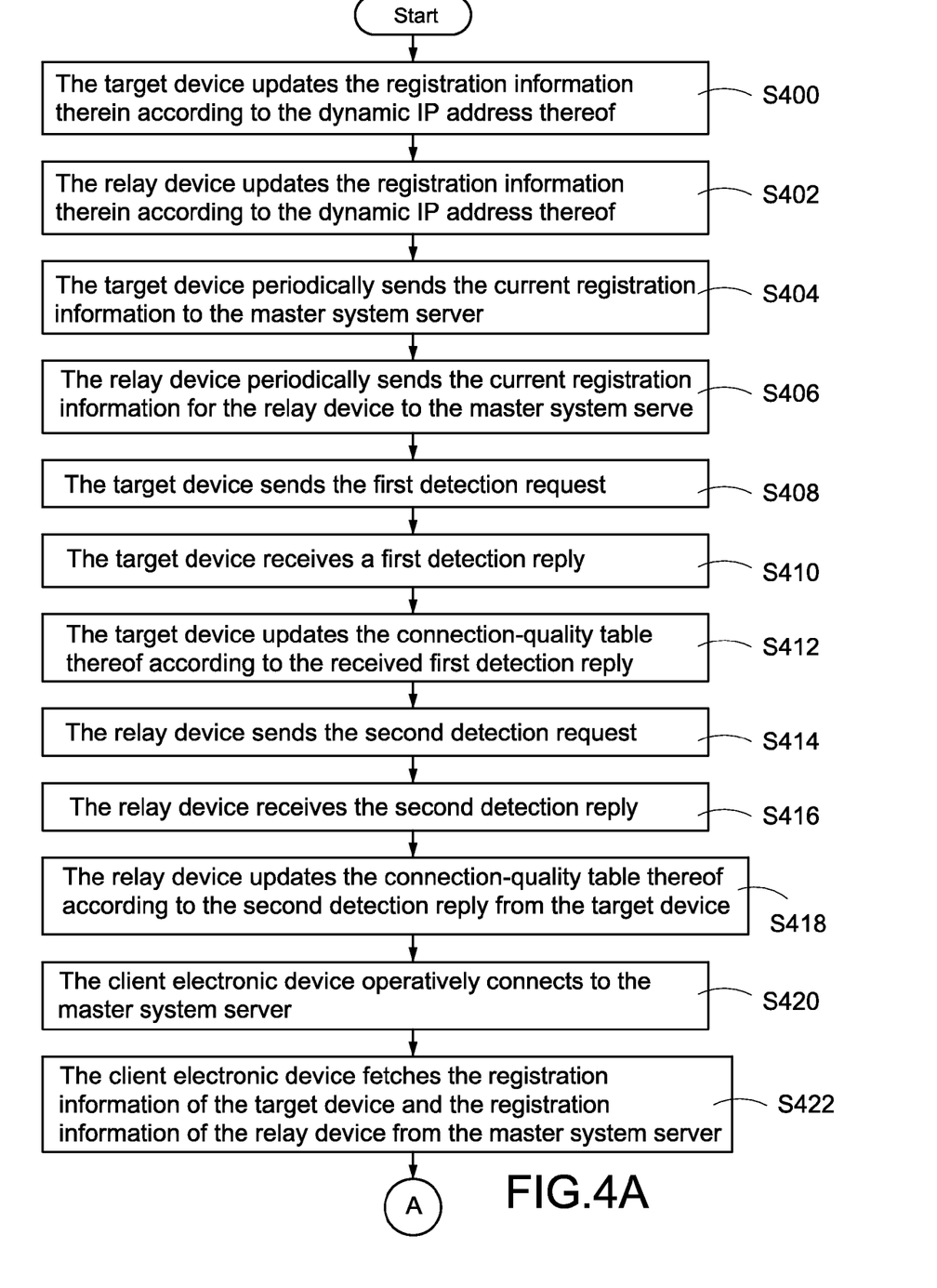
FIGS. 4A and 4B show the flowchart for the path routing method of peer-to-peer connection according to the fourth embodiment of the present invention.
Figure 4B:
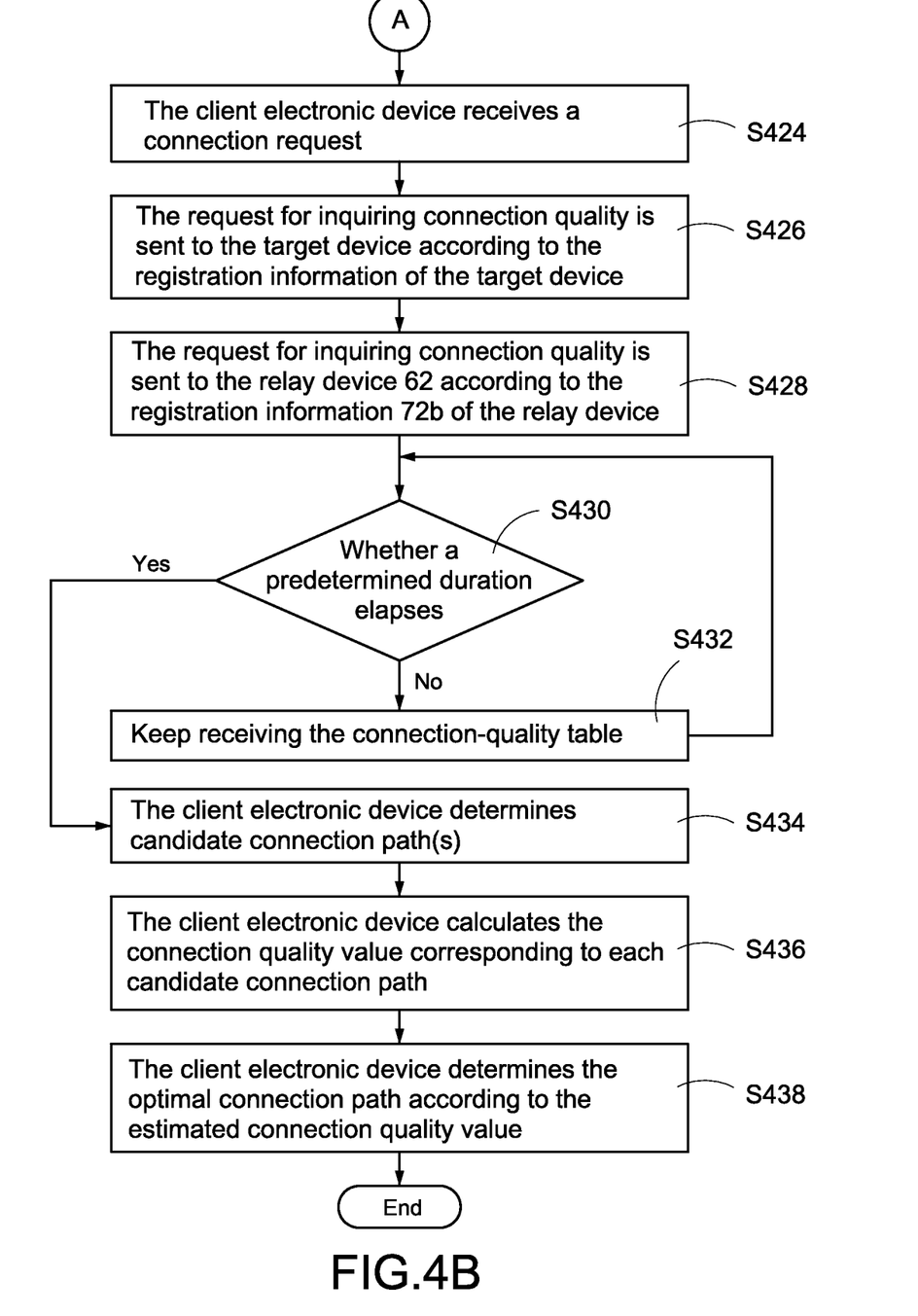

FIGS. 4A and 4B show the flowchart for the path routing method of peer-to-peer connection according to the fourth embodiment of the present invention. The method can be implemented with the system 1 shown in FIGS. 1A and 1B; alternatively, the method can also be implemented with the system 2 shown in FIG. 2, As shown in FIG. 4, in step S400, the target device 42 updates the registration information 420a therein according to the dynamic IP address thereof. More particularly, the dynamic IP address of the target device 42 is assigned by the first router 30. The registration information of the target device 42 comprises the dynamic IP address, device identification and device type. The target device 42 updates the dynamic IP address thereof in the registration information thereof.

In step S402, the relay device 62 updates the registration information 620b therein according to the dynamic IP address thereof. More particularly, the dynamic IP address of the relay device 62 is assigned by the second router 50. The registration information of the relay device 62 comprises the dynamic IP address, device identification and device type. The relay device 62 updates the dynamic IP address thereof in the registration information thereof.

In step S404, the target device 42 periodically sends the current registration information 420c to the master system server 70. More particularly, the target device 42 periodically establishes connection with the master system server 70 according to the registration information stored in the master system server 70 in advance, and the target device 42 sends the current registration information 420a to the master system server 70. According to another embodiment of the present invention, the target device 42 can also fetch registration information 72b for the relay device in the master system server 70.

In step S406, the relay device 62 periodically sends the current registration information 620b for the relay device to the master system server 70. More particularly, the relay device 62 periodically establishes connection with the master system server 70 according to the registration information stored in the master system server 70 in advance, and the relay device 62 sends the current registration information 620b to the master system server 70. According to another embodiment of the present invention, the relay device 62 can also fetch registration information 72a for the relay device in the master system server 70 or registration information for other relay devices 621-62n in the master system server 70.

In step S408, the target device 42 sends the first detection request. The target device 42 preferably sends the first detection request to the relay device 62 according to the registration information 72b of the relay device. The registration information 72b of the relay device can be preferably fetched from the master system server 70. Alternately, the relay device 62 actively sends the registration information 420b of the relay device to the target device 42.

In step S410, the target device 42 receives a first detection reply from the relay device 62. The target device 42 preferably receives the first detection reply from the relay device 62 within a predetermined duration, and the target device 42 stops receiving the first detection reply from the relay device 62 after the predetermined duration expires.

In step S412, the target device 42 updates the connection-quality table 420c thereof according to the received first detection reply. The target device 42 preferably calculates the connection-quality value according to the received first detection reply and then records the connection-quality value in the connection-quality table 420c for updating the connection-quality table 420c. The connection-quality value can be, for example but not limited to, the response time between the time of sending first detection request and the time of receiving the first detection reply, or the transmission speed between the target device 42 and the relay device 62.

In step S414, the relay device 62 sends the second detection request. The relay device 62 preferably sends the second detection request to the target device 42 or the relay devices 621-62n according to the registration information 72a of the target device or the registration information of the relay devices 621-62n. The registration information 72a of the target device or the registration information of the relay devices 621-62n can be fetched from the master system server 70. The target device 42 can also actively send the registration information 620a thereof to the relay device 62, or the relay devices 621-62n actively send the registration information thereof to the relay device 62.

In step S416, the relay device 62 receives the second detection reply from the target device 42. The relay device 62 preferably receives the second detection reply from the target device 42 within a predetermined duration, and the relay device 62 stops receiving the second detection reply from the target device 42 after the predetermined duration expires.

In step S418, the relay device 62 updates the connection-quality table 620c thereof according to the second detection reply from the target device 42.

The relay device 62 preferably calculates the connection-quality value according to the received second detection reply and then records the connection-quality value in the connection-quality table 620c for updating the connection-quality table 620c. The connection-quality value can be, for example but not limited to, the response time between the time of sending second detection request and the time of receiving the second detection reply, or the transmission speed between the target device 42 and the relay device 62 or the transmission speed between the relay device 62 and the relay devices 621-62n.

In step S420, the client electronic device 10 executes the application program to operatively connect to the master system server 70. The client electronic device 10 preferably employs the pre-stored registration information 72c of the master system server 70 to operatively connect to the master system server 70.

In step S422, the client electronic device 10 fetches the registration information 72a of the target device 42 and the registration information 72c of the relay device 62 from the master system server 70. Preferably, the registration information 72a of the target device 42 is sent to the master system server 70 from the target device 42 in step S404 and the registration information 72c of the relay device 62 is sent to the master system server 70 from the relay device 62 in step S406, respectively.

In step S424, the client electronic device 10 receives a connection request, where the connection request asks an operative connection between the client electronic device 10 and the target device 42 in the target subsystem 40, or an operative connection between the client electronic device 10 and the remote network device 44 in the target subsystem 40. The client electronic device 10 preferably receives a connection request from user through a graphic user interface (GUI).

In step S426, the request for inquiring connection quality is sent to the target device 42 according to the registration information 72a of the target device. The registration information 72a of the target device is fetched from the master system server 70.

In step S428, the request for inquiring connection quality is sent to the relay device 62 according to the registration information 72b of the relay device. The registration information 72b of the relay device is fetched from the master system server 70.

In step S430, the client electronic device 10 determines whether a predetermined duration elapses after the request for inquiring connection quality is sent. When the predetermined duration does not elapse, the step S432 is executed to keep receiving the connection-quality table. When the predetermined duration elapses, the step S434 is executed to stop receiving the connection-quality table and a connection path is selected according to the received connection-quality table(s).

In step S432, the client electronic device 10 allows to receive the connection-quality table 420c from the target device 42 or the connection-quality table 620c from the relay device 62 within the predetermined duration.

In step S434, the client electronic device 10 stops receiving the connection-quality table and determines at least one candidate connection path starting from the client electronic device 10 and ending at the target subsystem 40 according to the received connection-quality table 420c or the connection-quality table 620c.

In step S436, the client electronic device 10 calculates the connection quality value corresponding to each candidate connection path. The connection quality value is preferably the estimated response time for peer-to-peer connection through the candidate connection path.

In step S438, the client electronic device 10 determines the optimal connection path among the candidate connection path according to the connection quality value calculated in step S436. The client electronic device 10 preferably determines the candidate connection path with the shortest response time as the optimal connection path.

In above-mentioned embodiment, the connection quality value is the estimated response time for peer-to-peer connection and the client electronic device 10 determines the candidate connection path with the shortest response time as the optimal connection path. However, the connection quality value can also be the estimated transmission speed for peer-to-peer connection, and the client electronic device 10 determines the candidate connection path with the fastest transmission speed as the optimal connection path.

In the present invention, more candidate connection paths can be provided by adding relay devices 601-60$n$ in the system. The problem of connection failure or poor connection caused by disconnection or poor connection of single connection path, which is connected between the client electronic device and the target subsystem, can be overcome. The peer-to-peer connection system of the present invention can provide more satisfactory connection quality for user.

In the present invention, the relay device is used as relay node in peer-to-peer network connection, and the optimal connection path is determined by the connection quality, thus providing more satisfactory connection quality for user.

In the present invention, the peer-to-peer relay service, the remote surveillance network service and the gateway service are integrated into the target device 42 or the relay device 62. The hardware cost can be reduced and the hardware size can be more compact. The target device 42 and the relay device 62 can further provide peer-to-peer relay service beside the original services thereof and the gateway service.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A peer-to-peer connection system, comprising: a target subsystem, at least one relay subsystem, a master system server and a client electronic device,
   the target subsystem operatively connected to internet through a first router and comprising a target device, the target device comprising:
   a storage module for storing a connection-quality table;
   a processor module operatively connected to the storage module and configured to send the connection-quality table after receiving a request for inquiring connection quality;
   the at least one relay subsystem operatively connected to internet through a second router and comprising a relay device, the relay device comprising:
   a storage module for storing a connection-quality table;
   a processor module operatively connected to the storage module and configured to send the connection-quality table after receiving a request for inquiring connection quality; and
   a relay module operatively connected to the storage module and providing peer-to-peer connection relay service;
   the master system server operatively connected to internet and comprising:
   a storage module for storing registration information of the target device and registration information of each relay device, wherein the registration information of the target device comprises a newest dynamic IP address of the target device, the registration information of each relay device comprises a newest dynamic IP address of each relay device; and
   a processor module operatively connected to the storage module and configured to transfer the registration information of the target device and the registration information of each relay device; and
   the client electronic device operatively connected to internet and configured to receive a connection request, establishing an operative connection with the master system server according to a static IP address of registration information of the master system server, retrieving the registration information of the target device and the registration information of the relay device from the master system server, sending the request for inquiring connection quality to the target device according to the dynamic IP address of the registration information of the target device, and sending the request for inquiring connection quality to the relay device according to the dynamic IP address of the registration information of the relay device, the client electronic device configured to determine an optimal connection path according to the connection-quality table after receiving the connection-quality table, and establishing a first peer-to-peer connection with the relay device according to the optimal connection path and the registration information of the relay device, wherein the optimal connection path starts from the client electronic device and ends at the target subsystem;
   wherein the relay device connected to the client electronic device via the first peer-to-peer connection establishes an operative connection with the master system server according to the static IP address of the registration information of the master system, and retrieves the registration information of the target device from the master system server, and establishes a second peer-to-peer connection with the target device according to the dynamic IP address of the registration information of the target device to make the client electronic device indirectly connect to the target device via the first peer-to-peer connection and the second peer-to-peer connection.

2. The peer-to-peer connection system in claim 1, wherein the processor module of the target device is configured to periodically send the current registration information of the target device to the master system server, the processor module of the relay device is configured to periodically send the current registration information of the relay device to the master system server.

3. The peer-to-peer connection system in claim 2, wherein the registration information of the target device further comprises a device ID, and a device type data, the dynamic IP address of the target device being assigned by the first router, the registration information of the relay device further comprises a device ID, and a device type data, the dynamic IP address of the relay device being assigned by the second router, the device type data of the relay device indicating whether the relay device provides peer-to-peer relay service.

4. The peer-to-peer connection system in claim 1 wherein the target subsystem further comprises at least one remote network device operatively connected to the target device, the target device further comprises:
   a gateway module operatively connected to the processor module to operatively connect the remote network device to the first router; and
   a remote network controller operatively connected to the processor module to monitor the remote network device;
   wherein the client electronic device monitors the remote network device through the remote network controller after the client electronic device is operatively connected to the target device.

5. The peer-to-peer connection system in claim 1, wherein the processor module of the target device is configured to periodically send a first detection request and to update the connection quality table after receive a first detection reply, the processor module of the target device is configured to send a second detection reply after receiving a second detection request, wherein the processor module of the repay device is configured to periodically send the second detection request and to update the connection quality table after receive the second detection reply, the processor module of the relay device is configured to send a first detection reply after receiving the first detection request.

6. The peer-to-peer connection system in claim 5, wherein the client electronic device is configured to determine at least one candidate connection path according to the received connection quality table, each of the at least one candidate connection path starting from the client electronic device and ends at the target subsystem, the client electronic device is configured to calculate an estimated connection quality for the candidate connection path and to determine the optimal connection path according to the estimated connection quality of each of the at least one candidate connection path.

7. The peer-to-peer connection system in claim 6, wherein the connection quality table records a response time and the estimated connection quality is an estimated response time, the client electronic device is configured to determine the candidate connection path with the shortest estimated response time to be the optimal connection path.

8. The peer-to-peer connection system in claim 6, wherein the connection quality table records a transmission speed and the estimated connection quality is an estimated transmission speed, the client electronic device is configured to determine the candidate connection path with the fastest estimated transmission speed to be the optimal connection path.

9. A path routing method of peer-to-peer connection applied to a peer-to-peer connection system, the peer-to-peer connection system comprising a master system server, a target subsystem, at least one relay subsystem and a client electronic device, the master system server operatively connected to internet, the target subsystem operatively connected to internet through a first router and comprising at least one target device, the relay subsystem operatively connected to internet through a second router and comprising at least one relay device, the method comprising following steps:
   a) the client electronic device receiving a request for connection;
   b) establishing an operative connection with the master system server according to a static IP address of registration information of the master system server, retrieving registration information of the target device and registration information of the relay device from the master system server, wherein the registration information of the target device comprises a newest dynamic IP address of the target device, the registration information of each relay device comprises a newest dynamic IP address of each relay device;
   c) sending a request for inquiring connection quality to the target device according to the dynamic IP address of the registration information of the target device;
   d) sending the request for inquiring connection quality to the relay device according to the dynamic IP address of the registration information of the relay device;
   e) receiving a connection quality table from the target device or the relay device;
   f) determining an optimal connection path starting from the client electronic device and ending at the target subsystem;
   q) establishing a first peer-to-peer connection with the relay device according to the optimal connection path and the dynamic IP address of the registration information of the relay device, wherein the optimal connection path starts from the client electronic device and ends at the target subsystem;
   h) the relay device connected to the client electronic device via the first peer-to-peer connection establishing an operative connection with the master system server according to the static IP address of the registration information of the master system, and retrieving the registration information of the target device from the master system server; and
   i) the relay device establishing a second peer-to-peer connection with the target device according to the dynamic IP address of the registration information of the target device to make the client electronic device indirectly connect to the target device via the first peer-to-peer connection and the second peer-to-peer connection.

10. The method in claim 9, wherein before the step b1 the method further comprises:
   b1) the target device periodically sending the current registration information of the target device to the master system server; and
   b2) the relay device periodically sending the current registration information of the relay device to the master system server.

11. The method in claim 10, wherein before the step b1 the method further comprises:
   b3) the target device updating the registration information of the target device according to the newest dynamic IP address of the target device, wherein the dynamic IP address of the target device is assigned by the first router; and
   b4) the relay device updating the registration information of the relay device according to the newest dynamic IP address of the relay device, wherein the dynamic IP address of the relay device is assigned by the second router.

12. The method in claim 9, wherein the step e further comprises:
   e1) the client electronic device determining whether a predetermined time elapses during receiving the connection quality table; and e1) the client electronic device receiving the connection quality table from the target device or the relay device when the predetermined time does not elapse, wherein the connection quality tables contains connection quality values to indicate connection quality for connecting to the target device and the connection quality for connecting to the relay device, respectively.

13. The method in claim 9, before step c further comprising:
   c1) the target device sending at least one first detection request;
   c2) receiving a detection reply;
   c3) updating the connection quality table of the target device according to the first detection reply;
   c4) the relay device sending at least one second detection request;
   c5) receiving a detection reply; and
   c6) updating the connection quality table of the relay device according to the second detection reply.

14. The method in claim 9, wherein the step f further comprises:
   f1) determining at least one candidate connection path according to the connection quality table;
   f2) calculating an estimated connection quality for each candidate connection path; and
   f3) determines the optimal connection path according to the estimated connection quality of each candidate connection path.

15. The method in claim 14, wherein the connection quality table is configured to record response time, the estimated connection quality is an estimated response time, in step f3 the optimal connection path is the candidate connection path with the shortest estimated response time.

16. The method in claim 14, wherein the connection quality table is configured to record transmission speed, the estimated connection quality is an estimated transmission speed, in step f3 the optimal connection path is the candidate connection path with the fastest estimated transmission speed.

17. A computer application program comprising a non-transitory computer executable source code, the steps according to claim 9 being executed when a computer executed the computer application program.

* * * * *